May 28, 1940.  J. M. LUERS  2,202,591
PARTING TOOL
Filed May 25, 1939

INVENTOR.
John M. Luers
BY
ATTORNEY.

Patented May 28, 1940

2,202,591

UNITED STATES PATENT OFFICE 2,202,591

PARTING TOOL

John M. Luers, Chesterfield Township, Macomb County, Mich.

Application May 25, 1939, Serial No. 275,716

3 Claims. (Cl. 29—96)

This invention relates to improvements in parting tools. It has long been recognized that the margins of the cutting edges of parting tools wear away more rapidly than the margins of other types of cutting tools. This excessive wear is attributable to the heat generated during the operation. Not only is the tool heated by the normal cutting action but it is additionally heated by the chips the normal expansion of which, as they are severed from the work, is restricted between the sides of the cut the depth of which naturally increases as the operation proceeds. Consequently the chips become to some extent wedged on the tool between the opposite sides of the cut.

In parting tools such as the one under consideration wherein the cutting edge, or edges, extend transversely across one extremity of the cutting surface, or surfaces, all the said surfaces must be fed into the work along a line substantially radial from the work axis in order to obtain proper cutting action; it therefore follows that there cannot be any great vertical spacing between the planes along which the different cutting surfaces extend.

It is an object of this invention to provide a parting tool having a head longitudinally of the outer face of which a plurality of cutting surfaces are formed in transverse relation and along different though parallel planes to break up the chips transversely; and wherein the opposite sides of the forwardly projecting cutting surface portion, or portions, are undercut to effectually and completely separate the chips transversely of the slot being cut in the work as the said chips are severed from the work. Thus I aim to provide a parting tool by which the chips are cut in separate transverse sections thereby permitting their lateral expansion as they leave the work and overcoming the restriction of the expansion referred to.

Having thus briefly stated the major purpose and object of the invention I will now proceed to describe two preferred embodiments of the invention with the aid of the accompanying drawing in which.

Figure 1:
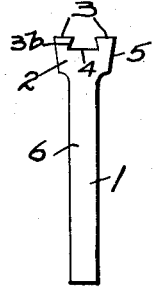
Figure 1 illustrates a front elevation of one form of my parting tool wherein the marginal cutting surfaces project beyond the central cutting surface.

Referring to the drawing, 1 designates a tool body which is relatively narrow and of uniform width throughout its length; formed integrally along one margin thereof is a head 2 wider than the said body and projecting laterally on both sides thereof. Formed longitudinally of the outer side of the head 2 are marginal cutting surfaces 3 and a central cutting surface 4 extending between them and parallel therewith but on a different plane. The sides 5 of the head which extend from the outer extremities of the marginal cutting surfaces are inwardly tapered towards the body 1 to provide cutting clearance. One extremity of the tool shown at 6 is downwardly and inwardly inclined from the cutting surfaces 3 and 4 to the lower side of the body 1, and cutting edges 3a and 4a are formed across the junction of the extremity 6 with the cutting surfaces 3 and 4 respectively.

In Figure 1 the marginal cutting surfaces 3 project beyond the central cutting surface 4 and the adjacent sides of the surface portions 3 are undercut longitudinally of the tool as shown at 3b. Due to these undercuts 3b chips are cut by the marginal surfaces 3 which are entirely separated from the chips cut by the central cutting surface 4.

Figure 2:
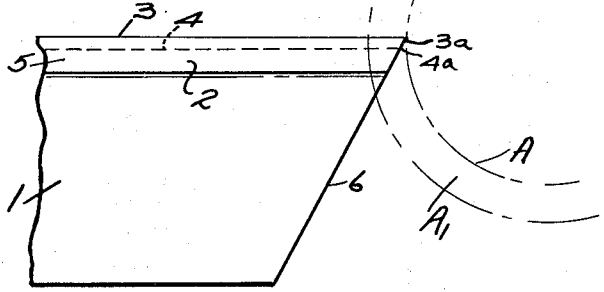
Figure 2 is a side elevation thereof.
Figure 3:
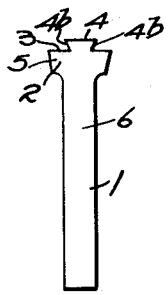
Figure 3 shows a modified form of the invention wherein the central cutting surface projects beyond the marginal cutting surfaces.
Figure 4:
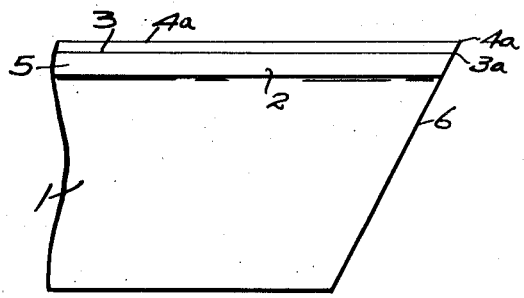
Figure 4 is a side view thereof.

In the modification shown in Figure 3 the central cutting surface 4 projects beyond the marginal cutting surfaces 3 and opposite sides 4b of the central cutting surface portion 4 are also undercut and for the same purpose, that is to completely sever the chips cut by the different cutting surfaces. Thus in either case three transversely separated chips are cut so that the normal chip expansion can occur without resulting in a wedged condition between the sides of the cut $A^1$ indicated in the work A, Figure 2.

While in the foregoing the preferred embodiments of the invention have been described and shown it is of course recognized the invention is susceptible to further alterations and modifications which are included within the scope of the appended claims.

What I claim is:

1. A parting tool comprising a body, a head extending longitudinally along of side of the body, the opposite sides of the head projecting laterally beyond the sides of the body, the outer edge face of the head having a plurality of cutting surfaces formed longitudinally therealong parallel to one another but on different planes whereby at least one cutting surface projects outwardly beyond the remainder of the head, the sides of the head portions whereon the cutting surfaces are formed being all inclined towards the body at less than 90° to the included cutting surfaces whereby undercuts are formed beneath the said surfaces to completely sever the chips cut by each surface from one another, the head being inwardly inclined at one extremity towards the body whereby cutting edges are formed across the junctions of the cutting surfaces with said extremity, and the tool being adapted to be fed into the work with its cutting surfaces longitudinally disposed along lines substantially radial to the work.

2. A parting tool comprising the combination set forth in claim 1, wherein the cutting surfaces include two marginal cutting surfaces and a central cutting surface between them which is outwardly disposed relative to said marginal surfaces.

3. A parting tool comprising the combination set forth in claim 1, wherein the cutting surfaces include two marginal cutting surfaces both of which are outwardly disposed relative to a central cutting surface between them.

JOHN M. LUERS.